United States Patent
Schreck et al.

(10) Patent No.: US 7,345,837 B1
(45) Date of Patent: Mar. 18, 2008

(54) DISK DRIVE THAT REFRESHES DATA ON PORTIONS OF A DISK BASED ON A NUMBER OF WRITE OPERATIONS THERETO

(75) Inventors: Erhard Schreck, San Jose, CA (US); Donald Brunnett, Pleasanton, CA (US); Hung V. Nguyen, San Jose, CA (US); Bruce Schardt, Tracy, CA (US); Andrew Vogan, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 296 days.

(21) Appl. No.: 11/184,273

(22) Filed: Jul. 19, 2005

Related U.S. Application Data

(60) Provisional application No. 60/632,501, filed on Dec. 2, 2004.

(51) Int. Cl.
*G11B 27/36* (2006.01)
*G11B 5/09* (2006.01)

(52) U.S. Cl. .......................... 360/31; 360/53
(58) Field of Classification Search .............. None
See application file for complete search history.

(56) References Cited

U.S. PATENT DOCUMENTS

| | | | |
|---|---|---|---|
| 6,809,893 B2 * | 10/2004 | Uzumaki et al. | 360/31 |
| 2004/0193798 A1 * | 9/2004 | Kuwamura | 711/114 |
| 2004/0268033 A1 * | 12/2004 | Chia et al. | 711/112 |
| 2005/0168859 A1 * | 8/2005 | Cho et al. | 360/55 |
| 2005/0180267 A1 * | 8/2005 | Jeong et al. | 368/96 |
| 2006/0066971 A1 * | 3/2006 | Alex et al. | 360/31 |
| 2006/0245102 A1 * | 11/2006 | Cheng | 360/53 |

\* cited by examiner

*Primary Examiner*—Andrea Wellington
*Assistant Examiner*—Dan I. Davidson
(74) *Attorney, Agent, or Firm*—Myers Bigel Sibley & Sajovec, P.A.

(57) ABSTRACT

A disk drive includes a rotatable data storage disk, a transducer, an actuator, and a controller. The transducer is configured to read and write data on the disk. The actuator is configured to position the transducer relative to defined portions of the disk. The controller is configured to determine how many times data has been written to the defined portions of the disk. The controller is also configured to refresh data residing at a particular one of the defined portions of the disk when the number of times data has been written to the particular defined portion of the disk satisfies a threshold value.

15 Claims, 6 Drawing Sheets

| Disk Surface Number | Monitored Groups of LBAs | Write Count | Threshold Values | Refresh Flag |
|---|---|---|---|---|
| 1 | LBA Group 1 | Count 1 | Value 1 | 1 |
| 1 | LBA Group 2 | Count 2 | Value 2 | 0 |
| 1 | LBA Group 3 | Count 3 | Value 3 | 0 |
| 1 | LBA Group 4 | Count 4 | Value 4 | 1 |
| 1 | ⋮ | | | |
| 1 | LBA Group $N_1$ | Count $N_1$ | Value $N_1$ | 1 |
| 2 | LBA Group 1 | Count 1 | Value 1 | 1 |

| Disk Surface Number | Monitored Groups of LBAs | Write Count | Threshold Values | Refresh Flag |
|---|---|---|---|---|
| 1 | LBA Group 1 | Count 1 | Value 1 | 1 |
| 1 | LBA Group 2 | Count 2 | Value 2 | 0 |
| 1 | LBA Group 3 | Count 3 | Value 3 | 0 |
| 1 | LBA Group 4 | Count 4 | Value 4 | 1 |
| 1 | ⋮ | | | |
| 1 | LBA Group $N_1$ | Count $N_1$ | Value $N_1$ | 1 |
| 2 | LBA Group 1 | Count 1 | Value 1 | 1 |

DISK DRIVE THAT REFRESHES DATA ON PORTIONS OF A DISK BASED ON A NUMBER OF WRITE OPERATIONS THERETO

RELATED APPLICATION

This application claims the benefit of and priority to U.S. Provisional Patent Application No. 60/632,501, filed Dec. 2, 2004, the disclosure of which is hereby incorporated herein by reference as if set forth in its entirety.

FIELD OF THE INVENTION

The present invention generally relates to digital data storage devices and, more particularly, to storing and accessing data in a magnetic disk drive.

BACKGROUND OF THE INVENTION

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent to surfaces of the disks to transfer data between the disks and a host computer. The transducers can be radially positioned over the disks by a rotary actuator and a closed loop, digital servo system, and can fly proximate to the surfaces of the disks upon air bearings. The transducers each typically contain a separate read element and write element.

Data is stored within concentric tracks on the disks. The magnetic recording disks are coated with a magnetic material that is capable of changing its magnetic orientation in response to an applied magnetic field. To write data to or read data from a disk, a transducer is positioned above a desired track of the disk while the disk is spinning.

Writing is performed by delivering a write signal having an alternating current to the write element. The write signal creates an alternating orientation magnetic field at a gap portion of the write element that induces magnetic polarity transitions in the magnetic material of the disk, and which thereby creates a data region on the track. The magnetic polarity transitions are representative of the stored data. Reading is performed by sensing magnetic polarity transitions previously written on tracks of the disk with the read element. As the disk spins below the transducer, the magnetic polarity transitions along a track present a varying magnetic field to the read element. The read element converts the magnetic signal into an analog read signal.

As data is written along a track, side lobes of the magnetic field from the write element erase a band of the disk that is adjacent to both sides of the track. When an erase band overlaps a sufficient amount of an adjacent track, any data thereon can become effectively erased, which can be referred to as adjacent track erasure. The spacing between adjacent tracks can be defined so that the erase bands of one track will generally not overlap adjacent tracks. Accordingly, the distance between tracks can be increased to avoid adjacent track erasure, however, increased track spacing can cause a corresponding decrease in the data storage capacity of the disk.

SUMMARY OF THE INVENTION

In some embodiments of the present invention, a disk drive includes a rotatable data storage disk, a transducer, an actuator, and a controller. The transducer is configured to read and write data on the disk. The actuator is configured to position the transducer relative to defined portions of the disk. The controller is configured to determine how many times data has been written to the defined portions of the disk. The controller is also configured to refresh data residing at a particular one of the defined portions of the disk when the number of times data has been written to the particular defined portion of the disk satisfies a threshold value.

Each of the defined portions of the disk can include a different group of radially adjacent tracks. With sufficient spacing between adjacent tracks, the erase bands from a single write operation along a particular track may not cause erasure of data in radially adjacent tracks. However, the cumulative effect of lots of write operations to the particular track may eventually cause adjacent track erasure if the data that is on the adjacent tracks is not repetitively refreshed. Accordingly, in some embodiments, the controller determines how many times data has been written to one of more tracks in a group. When the determined number of writes satisfies a threshold value (e.g., exceeds the threshold value), the data that resides on the tracks in the group is then refreshed. By refreshing the data, loss of the data due to the cumulative effects of adjacent track erasure may thereby be avoided.

In some further embodiments, the defined portions of the disk are assigned logical block addresses. The controller determines a number of times data has been written to one or more logical block addresses that are within defined groups of the logical block addresses. The controller can then refresh data residing on at least some of the logical block addresses in a particular one of the groups when the number of times that data has been written to one or more logical block addresses in the particular one of the groups satisfies the threshold value. The groups of the logical block addresses may be assigned to a plurality of sectors along a group of radially adjacent tracks on the disk, and may be assigned to a number of radially adjacent entire tracks. The controller can then refresh all of the data residing on the tracks associated with a particular group of the logical block addresses. When the controller refreshes data along a particular one of the groups of radially adjacent tracks, it can also refresh data residing on a defined number of boundary tracks that are radially adjacent to opposite sides of the particular group of tracks.

In yet some further embodiments, the controller can be further configured to begin carrying out the refresh of data residing at the particular one of the defined portions of the disk when the number of times data has been written thereto satisfies a first threshold value and no write operation from a host is waiting to be completed. The controller can be configured to interrupt the refresh of data when a write operation from a host is waiting to be completed. The controller may also be configured to carry out the refresh of data, while delaying a pending write operation from a host to the particular one of the defined portions of the disk, when the number of times that data has been written to the particular defined portion of the disk satisfies a second threshold value that is higher than the first threshold value.

In yet some further embodiments, the controller can be further configured to associate a separate threshold value with each of the defined portions of the disk, and to vary a particular threshold value associated with a particular one of the defined portions of the disk based on magnitude of write current that is used to write data through the transducer on the particular defined portion of the disk. Alternatively or additionally, the controller can vary the threshold value associated with each of the defined portions of the disk based on an indication of an amount of adjacent track erasure of data in tracks within the associated defined portion of the disk.

In yet some further embodiments, the controller can be further configured to refresh data by copying the data from an original storage location on the disk to a temporary storage location, and then copying the data from the temporary storage location to the original storage location. The controller can be configured to detect when the copying of data from the temporary storage location to the original storage location has been interrupted before completion, and to resume the copying based on the detected interruption.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
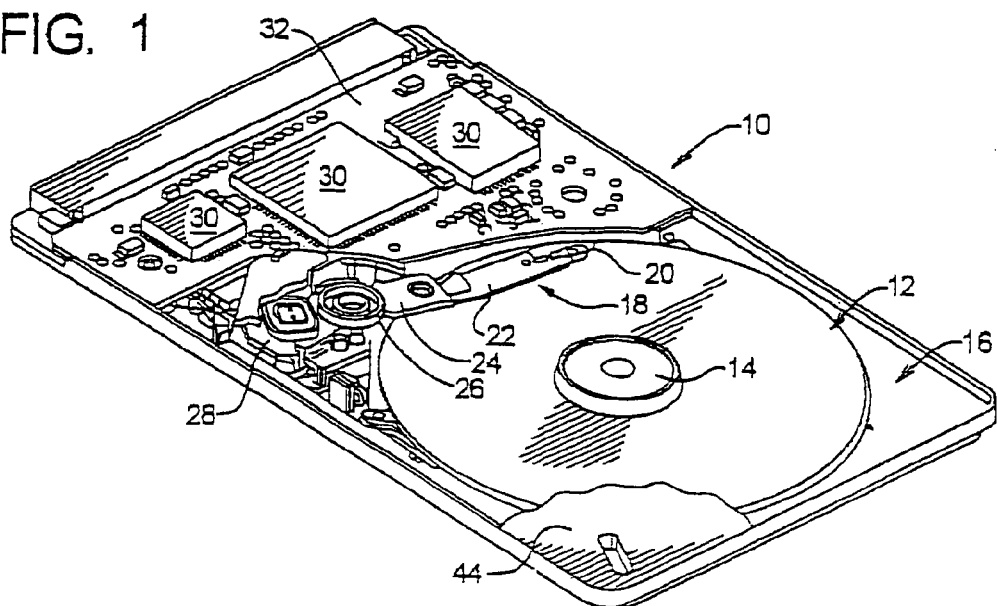
FIG. 1 is a perspective view of a disk drive that is configured in accordance with some embodiments of the present invention.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read operations from a host. A host can include, but is not limited to, a desktop computer, a laptop computer, a personal digital assistant (PDA), a digital video recorder/player, a digital music recorder/player, and/or another electronic device that can be communicatively coupled to store and retrieve data in a disk drive.

The actuator arm assembly 18 includes a transducer 20 (or head) mounted to a flexure arm 22 which is attached to an actuator arm 24 that can rotate about a pivot bearing assembly 26. The transducer 20 may comprise an magnetoresistive (MR) element or a thin film inductive (TFI)

element. The actuator arm assembly 18 also includes a voice coil motor (VCM) 28 which moves the transducer 20 relative to the disk stack 12. The spindle motor 14 and actuator arm assembly 18 are coupled to a controller and associated electronic circuits 30 mounted to a printed circuit board 32. The controller 30 may include analog and/or digital circuitry, and typically includes a digital signal processor (DSP), a microprocessor-based controller and a random access memory (RAM) device. As will be explained in more detail below, in accordance with some embodiments of the present invention, the controller 30 is configured to read/write data from the disk stack 12 responsive to commands from a host. The controller 30 is also configured to count how many times data has been written to defined portions of the disk stack 12, and to refresh data residing at a particular one of the defined portions when the counted writes thereto satisfies a threshold value.

Figure 2:
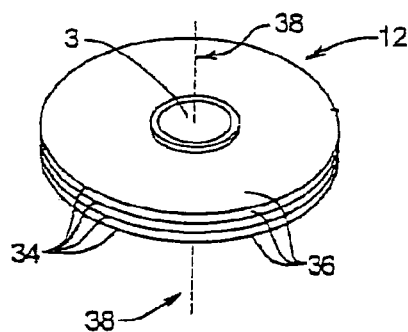
FIG. 2 is a block diagram of a disk stack having a plurality of data storage disks.

Referring now to the illustration of FIG. 2, the disk stack 12 typically includes a plurality of disks 34, each of which may have a pair of disk surfaces 36, 36. The disks 34 are mounted on a cylindrical shaft and are configured to rotate about axis 38. The spindle motor 14 as mentioned above, rotates the disk stack 12. Although the disks 34 are described as magnetic disks for purposes of illustration, they may alternatively be optical disks or any other type of rewritable data storage disk.

Figure 3:
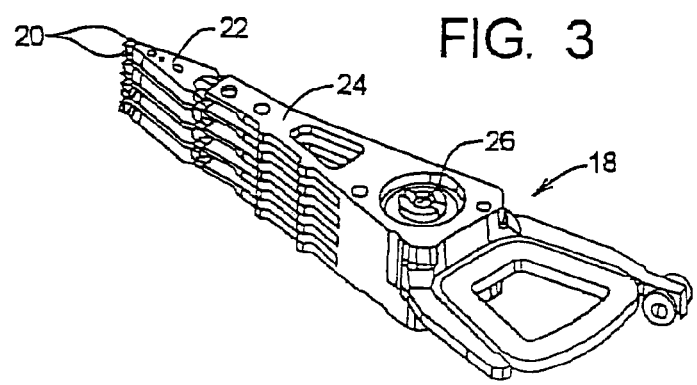
FIG. 3 is a perspective view of a portion of an actuator arm assembly having a plurality of actuator arms.

Referring now to the illustration of FIGS. 1 and 3, the actuator arm assembly 18 includes a plurality of the transducers 20, each of which are adjacent to a different one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Figure 4:
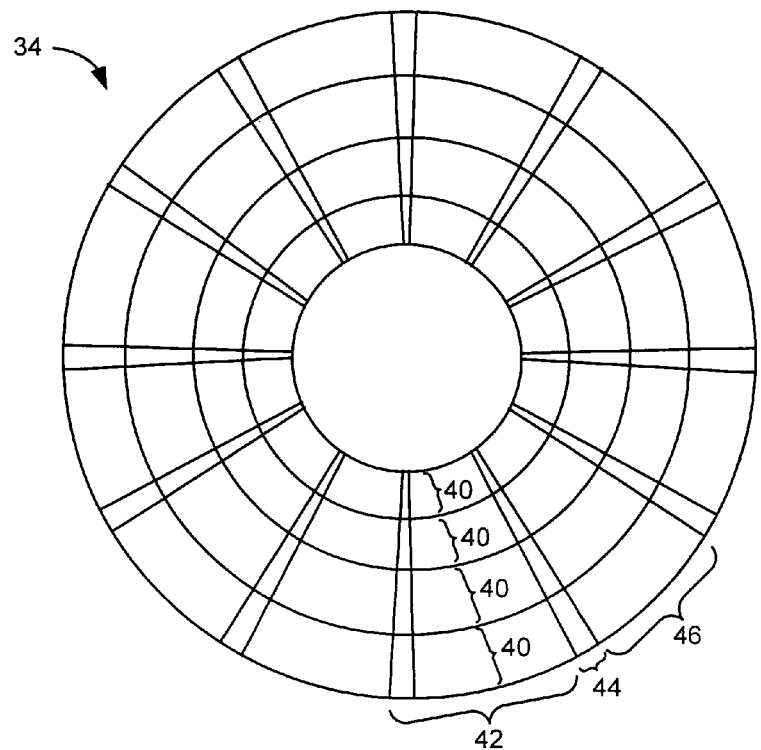
FIG. 4 is a top view of a disk and illustrates tracks and spokes, with each of the spokes being divided into a servo spoke and a data spoke.

FIG. 4 further illustrates one of the disks 34. Data is stored on the disk 34 within a number of concentric tracks 40 (or cylinders). Each track is divided into a plurality of radially extending sectors 42 on the disk 34. Each sector 42 is further divided into a servo region 44 and a data region 46. The servo regions 44 of the disk 34 are used to, among other things, accurately position the transducer 20 so that data can be properly written onto and read from the disk 34. The data regions 46 are where non-servo related data (i.e., user data) is stored and retrieved. Such data, upon proper conditions, may be overwritten. The data regions 46, or portions thereof, can be uniquely identified by logical block addresses (LBAs). A host can write data to and read data from the disk drive 10 by communicating respective write operations and read operations thereto that identify the associated LBAs on the disk 34 for the data operation.

Figure 5:
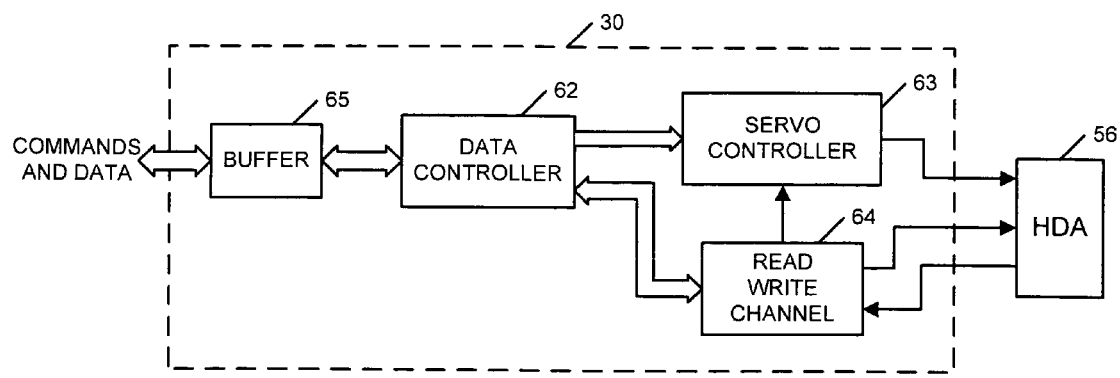
FIG. 5 is a block diagram of a portion of the controller of the disk drive shown in FIG. 1 according to some embodiments of the present invention.

Referring to FIG. 5, the controller 30 can include a data controller 62, a servo controller 63, a read/write channel 64, and a buffer 65. The exemplary embodiment of the controller 30 has been illustrated with two separate controllers 62,63, buffer 65, and a read/write channel 64 for purposes of illustration and discussion only. It is to be understood that the functionality that is described herein for the controllers 62,63, buffer 65, and/or the read/write channel 64 may be consolidated in fewer components or distributed among more components. The head disk assembly (HDA) 56 can include the actuator arm assembly 18, the disk stack 12, and the spindle motor 14.

Write commands and associated data from a host are buffered in the buffer 65. The data controller 62 is configured to carry out buffered write commands by formatting the associated data into blocks with the appropriate header information, and to transfer the formatted data from the buffer 65, via the read/write channel 64, to LBAs on the disk 34 that are identified by the associated write command.

The read/write channel 64 can operate in a conventional manner to convert data between the digital form used by the data controller 62 and the analog form conducted through the transducers 20 in the HDA 56. The read/write channel 64 provides servo positional information read from the HDA 56 to the servo controller 63. The servo positional information can be used to detect the location of the transducer 20 in relation to LBAs on the disk 34. The servo controller 63 can use LBAs from the data controller 62 and the servo positional information to seek the transducer 20 to an addressed track and block on the disk 34, and to maintain the transducer 20 aligned with the track while data is written/read on the disk 34. Accordingly, the data controller 62 and the servo controller 63 are collectively configured to carry out a write command by positioning the transducer 20 relative LBAs on the disk 34 while writing data from the buffer 65 to the disk.

Some embodiments of the present invention arise from a recognition that a cumulative effect of conducting many write operations to a particular track can be to cause deterioration of data that resides on the tracks that are radially adjacent to that track. If the data on the radially adjacent tracks is not rewritten or otherwise refreshed, it may become sufficiently deteriorated by repetitive write operations to the particular track so as to be effective erased. In accordance with some embodiments of the present invention, the data controller 62 is configured to divide the LBAs of the disk into groups, and to determine how many times data has been written to the defined groups of LBAs. When the determined number of writes for a particular group of LBAs satisfies a threshold value (e.g., exceeds the threshold value), the data that resides on that group of LBAs is refreshed. The data can be refreshed by reading it from its original location on the disk 34 and then rewriting it to its original location. The rewritten data thereby replaces what may have been deteriorated data. Consequently, loss of data due to the cumulative effects of adjacent track erasure may thereby be avoided.

Figures 6, 7:
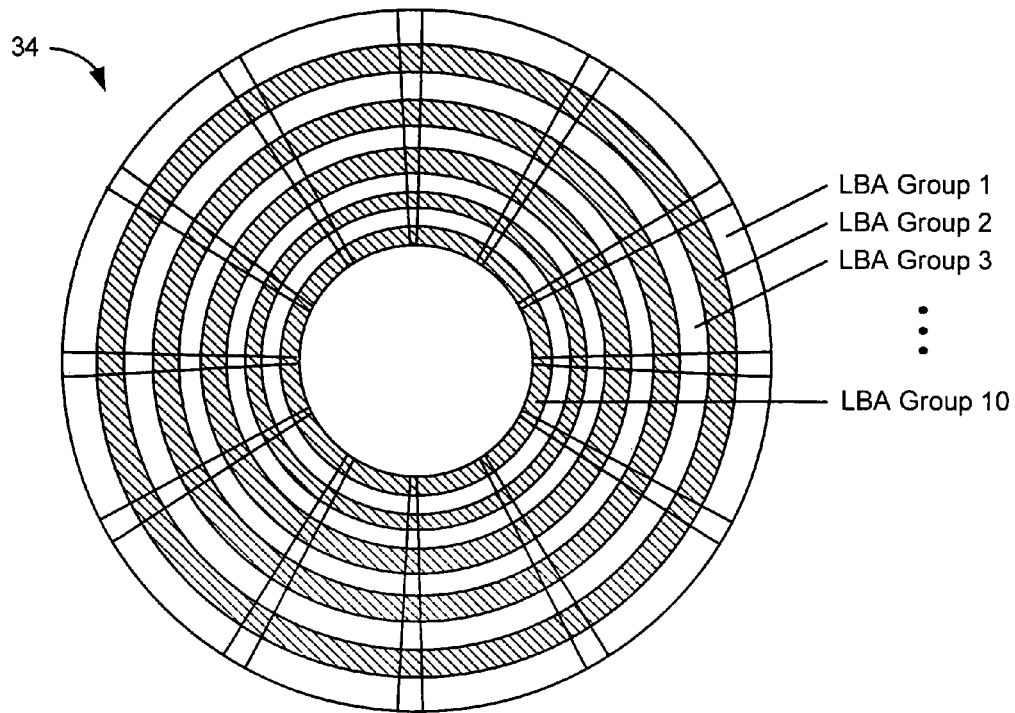
FIG. 6 is a top view of a disk and illustrates groups of tracks for which write operations thereto are counted, and on which data is refreshed in accordance with some embodiments of the present invention.
FIG. 7 is a data structure in which write operations to groups of logical block addresses (LBAs) on different disk surfaces are counted and a refresh flag is set when a threshold value is exceeded, in accordance with some embodiments of the present invention.

FIG. 6 is a top view of one of the surfaces 36 of the disk 34, and illustrates LBA groups that have been defined along a plurality of radially adjacent tracks around the disk 34. Each LBA group may include, for example, a range of from one hundred to over many thousands of radially adjacent tracks. The number of tracks that are included within each LBA group and the corresponding number of LBA groups defined for one of the disk surfaces 36 can be defined based on: 1) the size of the disk; 2) the distance between centers of radially adjacent tracks; 3) the density of data bits on a track, and/or 4) how much memory in the controller 30 and/or space on the disk 34 is to be used to maintain a separate count of write operations for each of the defined groups, and other associated information as will be discussed further below. For example, in some disk drives, hundreds or thousands of different LBA groups may be defined for one of the disk surfaces 36. Accordingly, although 10 different LBA groups have been shown in FIG. 6, it is to be understood that any number of groups may be defined for each surface 36 of disk 34. Additionally, although the LBA groups have been illustrated in FIG. 6 as each including entire groups of tracks around the disk, it is to be understood that the LBAs in a group may be associated with less than entire tracks, such as with one or more sectors of tracks.

Figure 8:
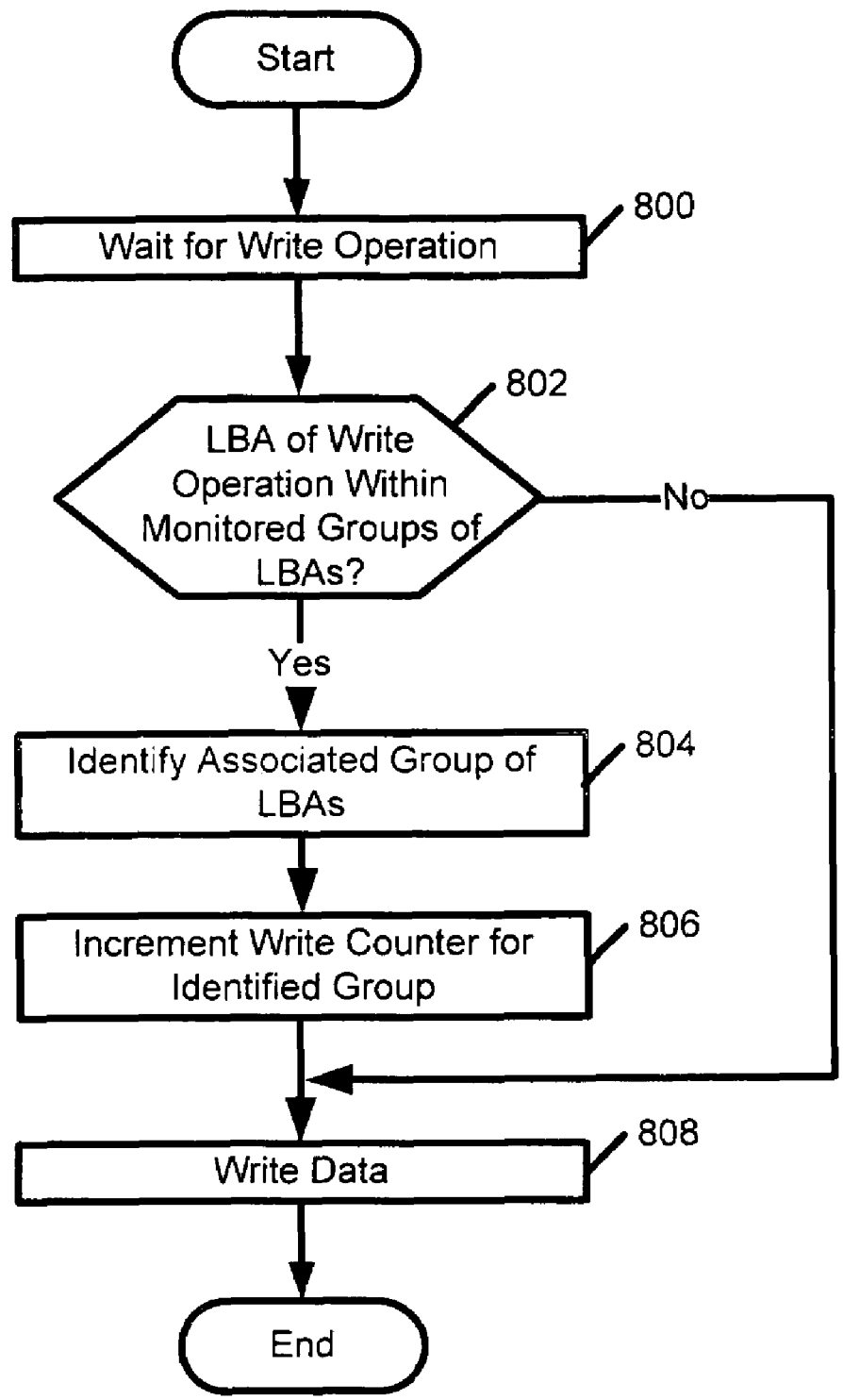
FIG. 8 is a flowchart showing operations for counting write operations for different groups of LBAs, in accordance with some embodiments of the present invention.

FIG. 8 is a flowchart of operations that may be carried out by the controller 30 and, more particularly, by the data controller 62 to count write operations for different groups of LBAs. In response to a write operation from a host, at Block 800, the data controller 62 makes a decision at Block 802 as to whether data for the write operation is to be written to one or more destination LBAs that are within a group that is to be monitored. When none of the destination LBAs is within a monitored group, the data controller 62 writes the data to the disk stack 12 at Block 808. However, when one or more of the destination LBAs are within one or more monitored groups, as determined at Block 802, the particular group(s) of LBAs to which the data is to be written is identified at Block 804. At Block 806, a write counter that is associated with the identified group(s) is incremented to reflect that data has been written to one or more LBAs in the identified group(s).

The controller 30 and, more particularly, the data controller 62 refreshes data associated with the LBAs of the different groups based on the associated write counters. The data controller 62 may handle the refresh operation with a differing priority relative to any pending read operations and/or write operations in the buffer 65 from a host. In some embodiments, the data controller 62 refreshes data at a particular group of LBAs as a background task, or low priority task, when the associated write counter exceeds a first refresh threshold but does not exceed a second refresh threshold, and no read operations and/or write operations are pending. As a background task, the refreshing of data may be interrupted by read operations and/or write operations that are subsequently received from a host, and can be resumed thereafter. When the write counter exceeds the second refresh threshold, pending write operations from the host that are directed to the LBA group associated with the write counter may be delayed while the data controller 62 refreshes the data at the particular LBA group.

The first refresh threshold value is less than the second refresh threshold value, and may be, for example, about 70% of the second refresh threshold value. For some types of transducers, the first refresh threshold value may be defined to be at least 1000.

The data controller 62 may associate individual refresh threshold values to different ones of the groups of LBAs. The refresh threshold values may be determined based on the adjacent track erasure characteristics of the transducer 20. For example, the refresh threshold values may be defined lower for a particular transducer that is more prone to cause erasure of adjacent track data, and may be defined higher for another transducer that is less prone to cause erasure of adjacent track data.

The data controller 62 may vary the refresh threshold value(s) that are associated with a particular group of LBAs based on a magnitude of the write current that is used to write data through the transducer 20 to one or more LBAs within that group of LBAs. For example, when a higher than average write current (i.e., threshold write current value) has been used once, or at least a threshold number of times, to write data to that group of LBAs, the associated refresh threshold value(s) that are associated with that group of LBAs may be increased by the data controller 62. Conversely, when a lower than average write current (i.e., threshold write current value) has been used once, or at least a threshold number of times, to write data to that group of LBAs, the associated refresh threshold value(s) may be decreased.

The data controller 62 may alternatively, or additionally, vary the refresh threshold value(s) that are associated with a particular group of LBAs based on an indication of an amount of adjacent track erasure of data in tracks that are within that group of LBAs. For example, the data controller 62 may measure the amount of adjacent track erasure based on error rates in data that read from the associated tracks, and may vary the refresh threshold values (s) based on the measured error rates.

Figure 9:
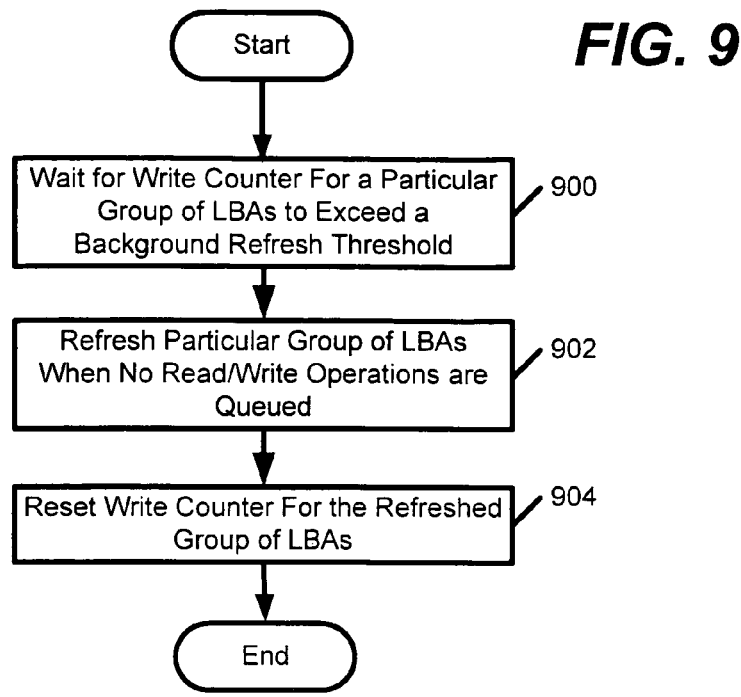
FIG. 9 is a flowchart showing operations for refreshing data residing in a particular group of LBAs as a background task when the counted writes thereto exceeds a background refresh threshold value, in accordance with some embodiments of the present invention.

FIG. 9 is a flowchart of operations to refresh data residing in a particular group of LBAs as a background task. Data refresh is not initiated until a write counter for a particular group of LBAs exceeds a background refresh threshold value at Block 900. The refreshing of data at the particular group of LBAs is carried out at Block 902 as a background, or low priority, task when no read and/or write operations from a host are pending in the buffer 65. Accordingly, read/write operations from the host may not be delayed by the data refresh operation. Otherwise, the read/write operations may be subject to possibly significant delay when a group of LBAs corresponds a substantial amount of data is refreshed before such read/write operations. At Block 904, the particular write counter is reset at Block 904 after the associated data has been completely refreshed.

Figure 10:
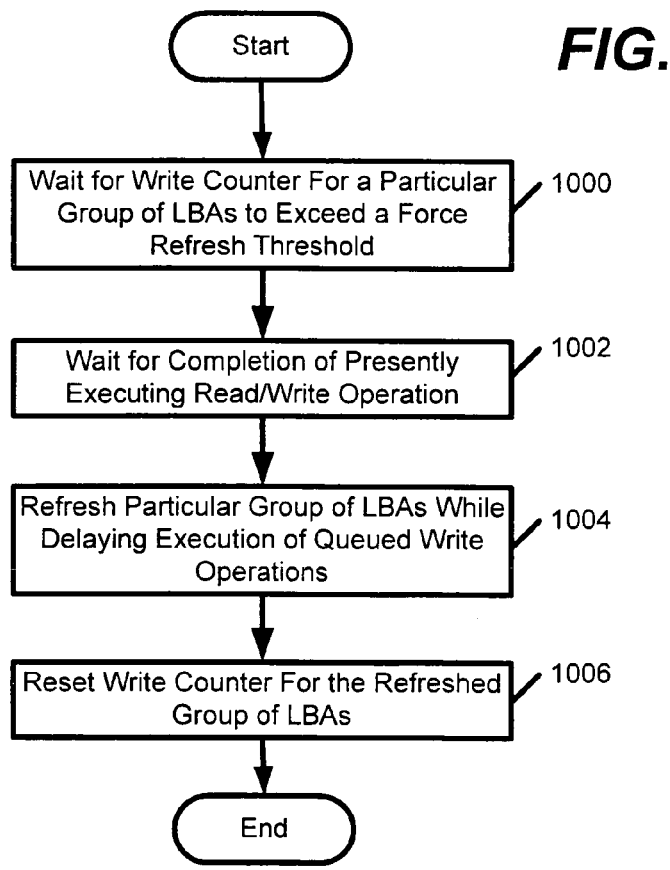
FIG. 10 is a flowchart showing operations for refreshing data while delaying queued write operations when the counted writes exceeds a forced refresh threshold value, in accordance with some embodiments of the present invention.

FIG. 10 is a flowchart of operations that may be carried out as a highest priority task when the operations of FIG. 9 are precluded from being carried out because of, for example, frequent read/write operations from the host. At Block 1000, when the write counter from FIG. 10 for the particular group of LBAs exceeds a second threshold value (called a forced refresh value), any presently executing read/write operation can be allowed to complete at Block 1002, and the data refresh is then carried out at Block 1004. In contrast to the data refresh operation at Block 902 of FIG. 9, at Block 1004 data is refreshed at the group of LBAs associated with the write counter while delaying execution of any queued read operations and/or write operations from the host. In some other embodiments, queued read operations or write operations from the host may be allowed to execute before the data is refreshed, except any write operations from the host which are directed to one or more LBAs in the group of LBAs associated with the write counter are delayed until after the data refresh has completed. At Block 1006, the particular write counter is reset at Block 1006 after the associated data has been completely refreshed.

Figure 11:
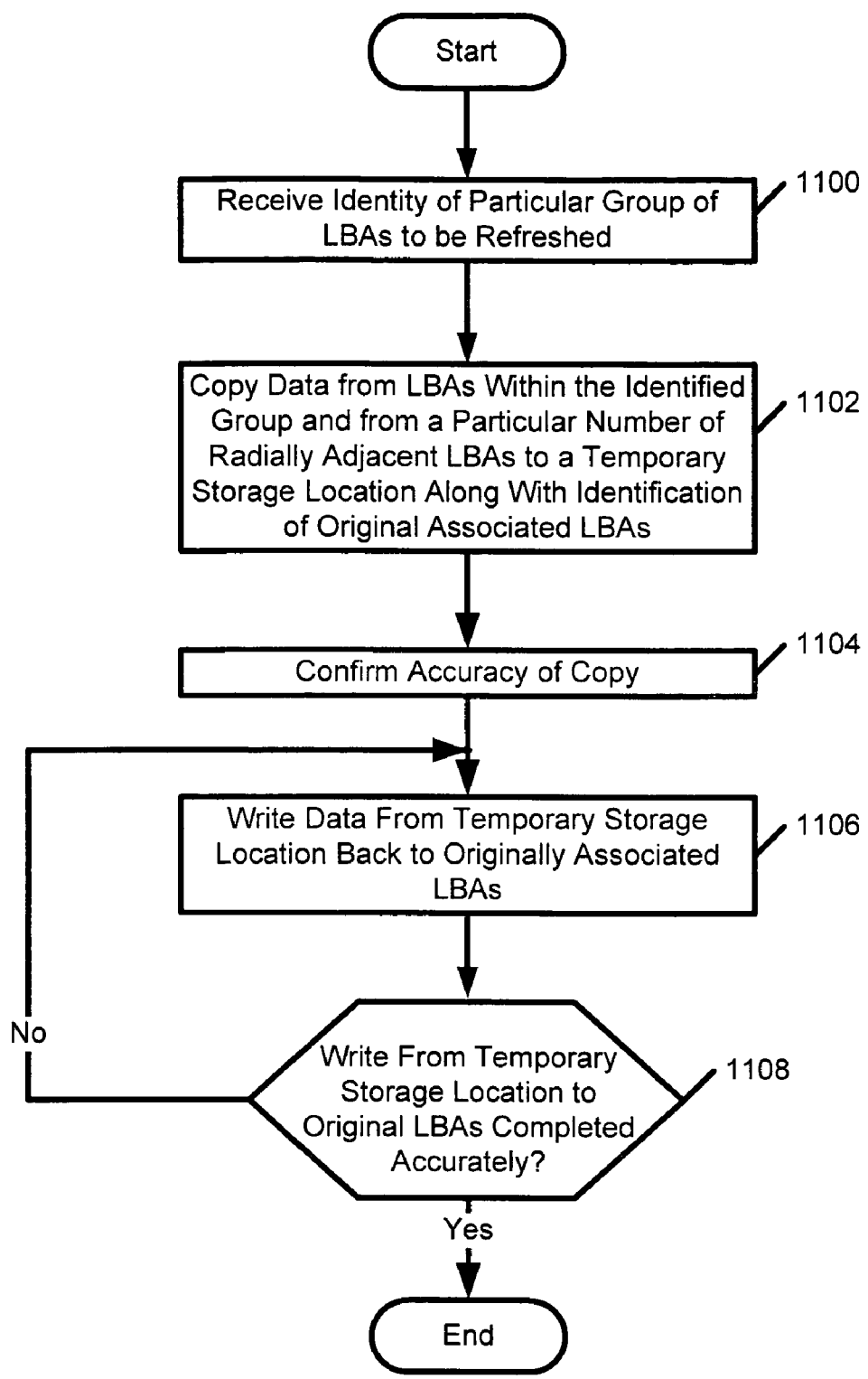
FIG. 11 is a flowchart showing operations for refreshing data residing in a particular group of LBAs, in accordance with some embodiments of the present invention.

FIG. 11 is a flowchart of operations that may be carried out to refresh the data at Block 902 of FIG. 9 and/or at Block 1004 of FIG. 10. At Block 1100, the group of LBAs is that is be refreshed is identified. At Block 1102, data that resides at the LBAs within the identified group is copied to a temporary storage location with an identification of where the data originally resided (original LBAs). Because some LBAs that are radially adjacent to, but outside of, the group of LBAs can also be deteriorated by write operations within the group of LBAs, a particular number of the radially adjacent LBAs can also be refreshed to avoid the effect of adjacent track erasure thereon. Accordingly, data from a particular number of the radially adjacent LBAs can also be copied to the temporary storage location with the identification of the original location of that data.

For example, when a group of LBAs is associated with entire tracks around the disk 34 and those tracks are refreshed, a particular number of tracks that are radially adjacent to the inner and outer radial boundaries of those tracks can also be refreshed. The number of boundary tracks that is refreshed can be defined based on the adjacent track erasure characteristics of the transducer 20 (i.e., the write element therein). For example, the number of boundary tracks that are refreshed may be in a range from about 1 to about 10 tracks based on the track erasure characteristics of some types of transducers.

At Block 1104, a test (e.g., comparison) is performed to confirm that the data was accurately copied from the original storage locations to the temporary storage location. Data that was not accurately copied from one or more LBAs can be recopied and tested. At Block 1106, the data is written from the temporary storage location back to the original storage locations (original LBAs). At Block 1108, a determination is made as to whether the copying of data from the temporary storage location to the original storage location (original LBAs) completed accurately. If the copying did not complete correctly, such as because of a loss of power during the copying and/or because of reading/writing errors, the writing of the data can be repeated at Block 1106 for the incomplete parts of the copying operation and/or for copied data that contains errors.

Referring now to FIG. 7, an exemplary data structure and associated operation of the disk drive 10 is explained in accordance with some embodiments of the present invention. The data structure shown in FIG. 7 may be maintained by the data controller 62 to manage the refreshing of data in defined groups of LBAs. The data structure includes separate columns for disk surface number, monitored group numbers, write counts, threshold values, and refresh flags. The disk surface number separately identifies each of the monitored disk surfaces 36 of each of the disks 34 in the disk stack 12 (FIG. 2). The monitored group numbers ("LBA Group 1" to "LBA Group N1") identify different groups of LBAs on each of the disk surfaces 36 for which write operations are counted and data is refreshed. The write counts column indicates how many write operations ("count 1" through "count N1") to each of the monitored groups of LBAs on corresponding ones of the disk surfaces 36. The threshold values column indicates the one or more threshold values that can cause initiation and priority handling of refresh operations, and which can vary from one LBA group to another. The refresh flag indicates when the counted writes exceeds a threshold value. For example, binary value "0" may indicate that the counted number of writes has not exceeded a first refresh threshold value (e.g., background refresh operation), and binary value "1" may indicated that the counted number has not exceed the first threshold value.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
a rotatable data storage disk;
a transducer that is configured to read and write data on the disk;
an actuator that is configured to position the transducer relative to defined portions of the disk which are assigned logical block addresses; and
a controller that is configured to determine a number of times data has been written to one or more logical block addresses that are within defined groups of the logical block addresses, to refresh data residing on at least some of the logical block addresses in a particular one of the groups when the number of times that data has been written to one or more logical block addresses in the particular one of the groups satisfies a threshold value,
wherein the defined groups of the logical block addresses are assigned to a defined number of radially adjacent entire tracks, and the controller is configured to refresh all of the data residing on the tracks associated with a particular group of the logical block addresses.

2. A disk drive comprising:
a rotatable data storage disk;
a transducer that is configured to read and write data on the disk;
an actuator that is configured to position the transducer relative to defined portions of the disk which are assigned logical block addresses; and
a controller that is configured to determine a number of times data has been written to one or more logical block addresses that are within defined groups of the logical block addresses, to refresh data residing on at least some of the logical block addresses in a particular one of the groups when the number of times that data has been written to one or more logical block addresses in the particular one of the groups satisfies a threshold value,
wherein the defined groups of the logical block addresses are assigned to radially adjacent tracks, and
wherein when the controller refreshes data along a particular one of the groups of radially adjacent tracks, it is configured to also refresh data residing on a defined number of boundary tracks that are radially adjacent to opposite sides of the particular group of tracks.

3. The disk drive of claim 2, wherein the controller is further configured to count a number of times data has been written to the particular one of the groups of logical block addresses since data on that particular one of the groups was refreshed, to refresh data residing at the particular one of the groups when the counted number of times satisfies a threshold value, and to reset the counted number of times based on the refresh of data on the particular one of the groups.

4. The disk drive of claim 2, wherein the defined number of boundary tracks that are refreshed is in a range from 1 to 10 tracks.

5. The disk drive of claim 2, wherein the threshold value corresponds to at least 1000 data writes to the particular one of the groups since data residing on the particular one of the groups was refreshed.

6. A disk drive comprising:
a rotatable data storage disk;
a transducer that is configured to read and write data on the disk;
an actuator that is configured to position the transducer relative to defined portions of the disk; and
a controller that is configured to determine how many times data has been written to the defined portions of the disk, to begin refreshing data residing at a particular one of the defined portions of the disk when the number of times that data has been written thereto exceeds a first threshold value and no write operation from a host is waiting to be completed, to interrupt the refreshing of data when a write operation from a host is pending and the number of times that data has been written to the particular one of the defined portions of the disk does not exceed a second threshold value that is higher than the first threshold value, and to carry out the refreshing of data residing at the particular one of the defined portions of the disk while delaying carrying out a pending write operation from the host to the particular one of the defined portions of the disk when the number of times that data has been written to the particular defined portion of the disk exceeds the second threshold value.

7. The disk drive of claim 6, wherein the controller is further configured to carry out the refresh of data residing at the particular one of the defined portions of the disk while delaying carrying out a pending read operation or write operation from a host when the number of times that data has been written to the particular defined portion of the disk exceeds the second threshold value.

8. A disk drive comprising:
a rotatable data storage disk;
a transducer that is configured to read and write data on the disk;
an actuator that is configured to position the transducer relative to defined portions of the disk; and
a controller that is configured to determine how many times data has been written to the defined portions of the disk, to associate a separate threshold value with each of the defined portions of the disk, to refresh data residing at a particular one of the defined portions of the disk when the number of times data has been written thereto satisfies the associated threshold value, and to vary individual ones of the threshold values based on an indication of an amount of adjacent track erasure of data on the associated defined portion of the disk.

9. The disk drive of claim 8, wherein the controller is further configured to vary a particular threshold value associated with a particular one of the defined portions of the disk based on magnitude of write current that is used to write data through the transducer on the particular defined portion of the disk.

10. The disk drive of claim 9, wherein the controller is further configured to increase individual ones of the threshold values responsive to a write current magnitude that is less than a threshold current value used to write data through the transducer on the associated defined portions of the disk, and to decrease the particular threshold value responsive to the write current magnitude being higher than the threshold current value.

11. The disk drive of claim 8, wherein the controller is further configured to measure the amount of adjacent track erasure based on an error rate of data read from the associated defined portion of the disk.

12. A method of writing data in a disk drive having a rotatable data storage disk, the method comprising:
determining how many times data has been written to one or more logical block addresses that are within one or more of defined groups of logical block addresses;
refreshing data residing on all of the logical block addresses in a particular one of the groups when the number of times that data has been written to one or more logical block addresses in the particular group satisfies a first threshold value and while delaying carrying out a pending write operation from a host to one or more logical block addresses in the particular group when the number of times that data has been written to the particular group satisfies a second threshold value that is higher than the first threshold value.

13. A method of writing data in a disk drive having a rotatable data storage disk, the method comprising:
determining how many times data has been written to defined portions of the disk;
associating a separate threshold value with each of the defined portions of the disk;
refreshing data residing at a particular one of the defined portions of the disk when the number of times that data has been written thereto satisfies the associated threshold value; and
varying individual ones of the threshold values based on an indication of an amount of adjacent track erasure of data on the associated defined portion of the disk.

14. The method of claim 13, further comprising:
varying a threshold value associated with a particular one of the defined portions of the disk based on magnitude of write current that is used to write data on the particular defined portion of the disk.

15. The method of claim 13, wherein refreshing data residing at a particular one of the defined portions of the disk comprises:
copying the data from an original storage location on the disk to a temporary storage location;
copying the data from the temporary storage location to the original storage location; and
detecting when the copying of data from the temporary storage location to the original storage location has been interrupted before completion, and resuming the copying based on the detected interruption.

* * * * *